US010444755B2

(12) United States Patent
Kuroda

(10) Patent No.: US 10,444,755 B2
(45) Date of Patent: Oct. 15, 2019

(54) AUTONOMOUS TRAVEL VEHICLE CONTROL DEVICE, AUTONOMOUS TRAVEL VEHICLE CONTROL SYSTEM, AND AUTONOMOUS TRAVEL VEHICLE CONTROL METHOD

(71) Applicant: Sharp Kabushiki Kaisha, Sakai, Osaka (JP)

(72) Inventor: Tatsuro Kuroda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 68 days.

(21) Appl. No.: 15/685,406

(22) Filed: Aug. 24, 2017

(65) Prior Publication Data
US 2018/0059667 A1 Mar. 1, 2018

(30) Foreign Application Priority Data
Aug. 26, 2016 (JP) .................................. 2016-165283

(51) Int. Cl.
G05D 1/02 (2006.01)
B60W 40/068 (2012.01)
B60W 40/076 (2012.01)
B60W 50/14 (2012.01)
G05D 1/00 (2006.01)
G06F 3/14 (2006.01)
G06K 9/00 (2006.01)

(52) U.S. Cl.
CPC ......... *G05D 1/0212* (2013.01); *B60W 40/068* (2013.01); *B60W 40/076* (2013.01); *B60W 50/14* (2013.01); *G05D 1/0088* (2013.01); *G06F 3/14* (2013.01); *G06K 9/00* (2013.01); *G06K 9/00798* (2013.01); *G06K 9/00805* (2013.01); *B60W 2050/146* (2013.01); *B60W 2550/10* (2013.01); *B60W 2550/12* (2013.01)

(58) Field of Classification Search
CPC .. B60W 40/068; B60W 40/076; B60W 50/14; B60W 2050/146; B60W 2550/10; B60W 2550/12; G05D 1/0088; G05D 1/0212; G06F 3/14; G06K 9/00798; G06K 9/00805
USPC .......................................................... 701/23
See application file for complete search history.

(56) References Cited

U.S. PATENT DOCUMENTS 10,126,136 B2 * 11/2018 Iagnemma ........... G05D 1/0088
2008/0091309 A1 * 4/2008 Walker ................... B60R 25/02
701/1

(Continued)

FOREIGN PATENT DOCUMENTS

JP 11-194821 A 7/1999

*Primary Examiner* — Atul Trivedi
(74) *Attorney, Agent, or Firm* — Keating & Bennett, LLP

(57) ABSTRACT

There is provided an autonomous travel vehicle control device that sets a travel path of an autonomous travel vehicle performing autonomous travel based on surroundings information. The device includes; a moving path determination unit that sets the travel path, a travelling influence information acquisition unit that acquires travelling influence information influencing a travel state of the autonomous travel vehicle, a travel path prediction unit that predicts the travel path based on the travelling influence information, and a travel path display unit that displays the travel path predicted by the travel path prediction unit.

20 Claims, 11 Drawing Sheets

(56) References Cited

U.S. PATENT DOCUMENTS

| | | | |
|---|---|---|---|
| 2010/0063663 A1* | 3/2010 | Tolstedt | G05D 1/0231 |
| | | | 701/23 |
| 2010/0106356 A1* | 4/2010 | Trepagnier | G01S 17/023 |
| | | | 701/25 |
| 2013/0327244 A1* | 12/2013 | Robbert | B61B 13/08 |
| | | | 104/281 |
| 2014/0136414 A1* | 5/2014 | Abhyanker | G06Q 50/28 |
| | | | 705/44 |
| 2015/0202770 A1* | 7/2015 | Patron | G05D 1/024 |
| | | | 700/245 |
| 2015/0372065 A1* | 12/2015 | Yamazaki | H01L 27/3276 |
| | | | 257/89 |
| 2016/0117853 A1* | 4/2016 | Zhong | B64C 39/024 |
| | | | 345/634 |
| 2016/0139598 A1* | 5/2016 | Ichikawa | B60W 30/09 |
| | | | 701/25 |
| 2016/0259028 A1* | 9/2016 | High | E01H 5/12 |
| 2017/0123429 A1* | 5/2017 | Levinson | G05D 1/0088 |
| 2017/0313332 A1* | 11/2017 | Paget | B61L 27/0077 |
| 2017/0364070 A1* | 12/2017 | Oba | B60W 50/08 |
| 2018/0078843 A1* | 3/2018 | Tran | G16H 40/63 |
| 2018/0164822 A1* | 6/2018 | Chu | G01C 21/3407 |
| 2018/0164827 A1* | 6/2018 | Chu | G05D 1/0217 |
| 2018/0349713 A1* | 12/2018 | Jiang | G06K 9/00805 |
| 2019/0150357 A1* | 5/2019 | Wu | A01C 21/007 |

\* cited by examiner

AUTONOMOUS TRAVEL VEHICLE CONTROL DEVICE, AUTONOMOUS TRAVEL VEHICLE CONTROL SYSTEM, AND AUTONOMOUS TRAVEL VEHICLE CONTROL METHOD

BACKGROUND

1. Field

The present disclosure relates to an autonomous travel vehicle control device, an autonomous travel vehicle control system, and an autonomous travel vehicle control method, particularly to an autonomous travel vehicle control device, an autonomous travel vehicle control system, and an autonomous travel vehicle control method which sets a travel path of an autonomous travel vehicle performing autonomous travel based on surroundings information.

2. Description of the Related Art

Recent years, a technology for an autonomous travel vehicle is known, in which surroundings information (distance information or the like) in a travelling direction of a moving object such as an autonomous travel vehicle is acquired, an obstacle existing around the moving object is detected by an obstacle sensor based on the surroundings information, and then, the autonomous travel vehicle is enabled to autonomously travel.

When giving an instruction to the autonomous travel vehicle about the travel path, sometimes the instruction is performed by a manual driving and sometimes the instruction is performed using a map displayed by a driving control device on a screen of a display unit.

However, at the time of giving the instruction to the autonomous travel vehicle about the travel path, it is not possible to know how effectively the obstacle sensor detects the obstacle and what kinds of information can be obtained. Therefore, there is a problem in that, even if something is present on the travel path that stops the autonomous travel due to the obstacle detection, it is difficult to recognize the obstacle until the autonomous travel is actually tried.

As the related art, for example, a travel control device for a vehicle is proposed, in which a travel control of an unmanned-carrier vehicle travelling along a predetermined travel path is performed by a simulation travel of the carrier vehicle on a personal computer and fine tuning of a feedback control is performed using control parameters (refer to Japanese Unexamined Patent Application Publication No. 11-194821).

In this configuration, it is possible to appropriately tune the control parameters for the feedback control based on the result of simulation.

In the travel control device in Japanese Unexamined Patent Application Publication No. 11-194821 described above, it is possible to ensure an excellent travel of the vehicle by appropriately setting the control parameters for the feedback control using the simulation travel of the vehicle. However, there is a problem in that it is not possible to predict the travel of the vehicle in consideration with an influence of the state of the travel path.

SUMMARY

The present disclosure provides an autonomous travel vehicle control device, an autonomous travel vehicle control system, and an autonomous travel vehicle control method which can set an accurate travel path by predicting a travel state of an autonomous travel vehicle.

An autonomous travel vehicle control device, an autonomous travel vehicle control system, and an autonomous travel vehicle control method in the present disclosure are as follows.

An autonomous travel vehicle control device in the present disclosure that sets a travel path of an autonomous travel vehicle performing autonomous travel based on surroundings information includes a display unit that displays the travel path of the autonomous travel vehicle, a path setting unit that sets the travel path, a travelling influence information acquisition unit that acquires travelling influence information influencing a travel state of the autonomous travel vehicle, a travel path prediction unit that predicts the travel path based on the travelling influence information, and a travel path display unit that displays the travel path predicted by the travel path prediction unit on the display unit.

In addition, an autonomous travel vehicle control system in the present disclosure that sets a travel path of an autonomous travel vehicle includes an autonomous travel vehicle that performs autonomous travel based on surroundings information, and an external server that is capable of wirelessly communicating with the autonomous travel vehicle. The autonomous travel vehicle is configured to include a control unit that controls travelling of the autonomous travel vehicle, and a travelling influence information acquisition unit that acquires travelling influence information influencing a travel state of the autonomous travel vehicle. The external server is configured to include a display unit that displays the travel path of the autonomous travel vehicle, a path setting unit that sets the travel path, a travel path prediction unit that predicts the travel path based on the travelling influence information acquired by the travelling influence information acquisition unit, and a travel path display unit that displays the travel path predicted by the travel path prediction unit on the display unit.

In addition, an autonomous travel vehicle control method in the present disclosure for setting a travel path of autonomous travel vehicle performing autonomous travel based on surroundings information includes displaying the travel path of the autonomous travel vehicle, setting the travel path; acquiring travelling influence information influencing a travel state of the autonomous travel vehicle; predicting the travel path based on the travelling influence information; and displaying the travel path predicted by the travel path prediction unit on the display unit.

DESCRIPTION OF THE EMBODIMENTS

First Embodiment

Figure 1:
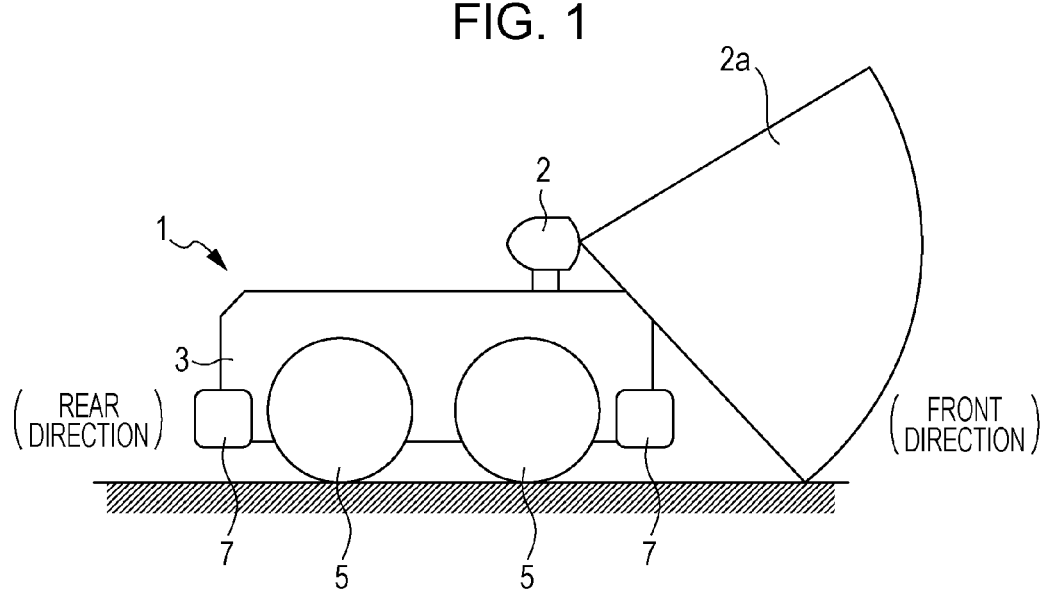
FIG. 1 is an explanatory diagram illustrating an overall configuration of an autonomous travel vehicle on which a travel control is performed by an autonomous travel vehicle control device in a first embodiment of the present disclosure.
Figure 3:
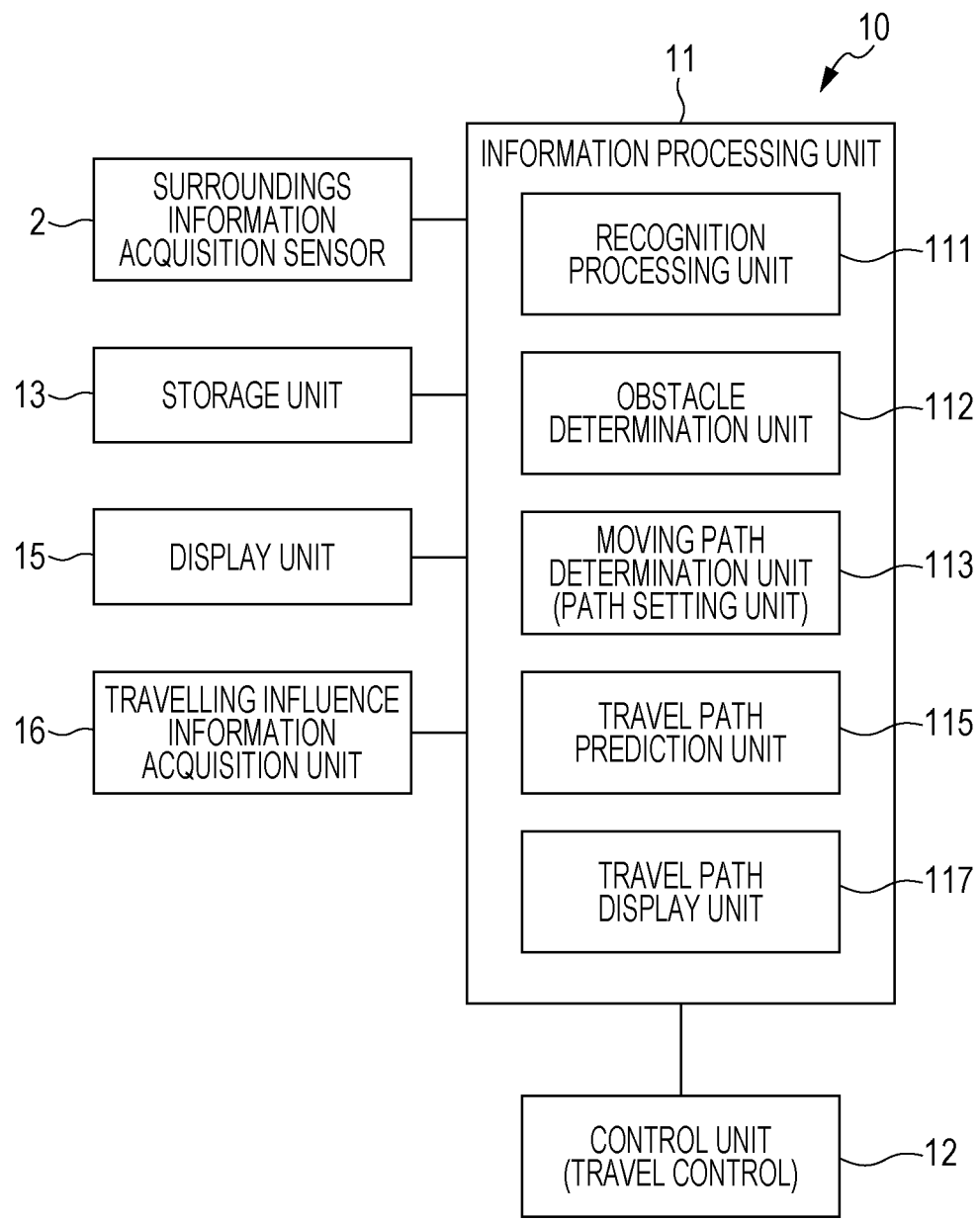
FIG. 3 is a block diagram illustrating a configuration of an information processing unit that configures the autonomous travel vehicle control device.
Figure 4:
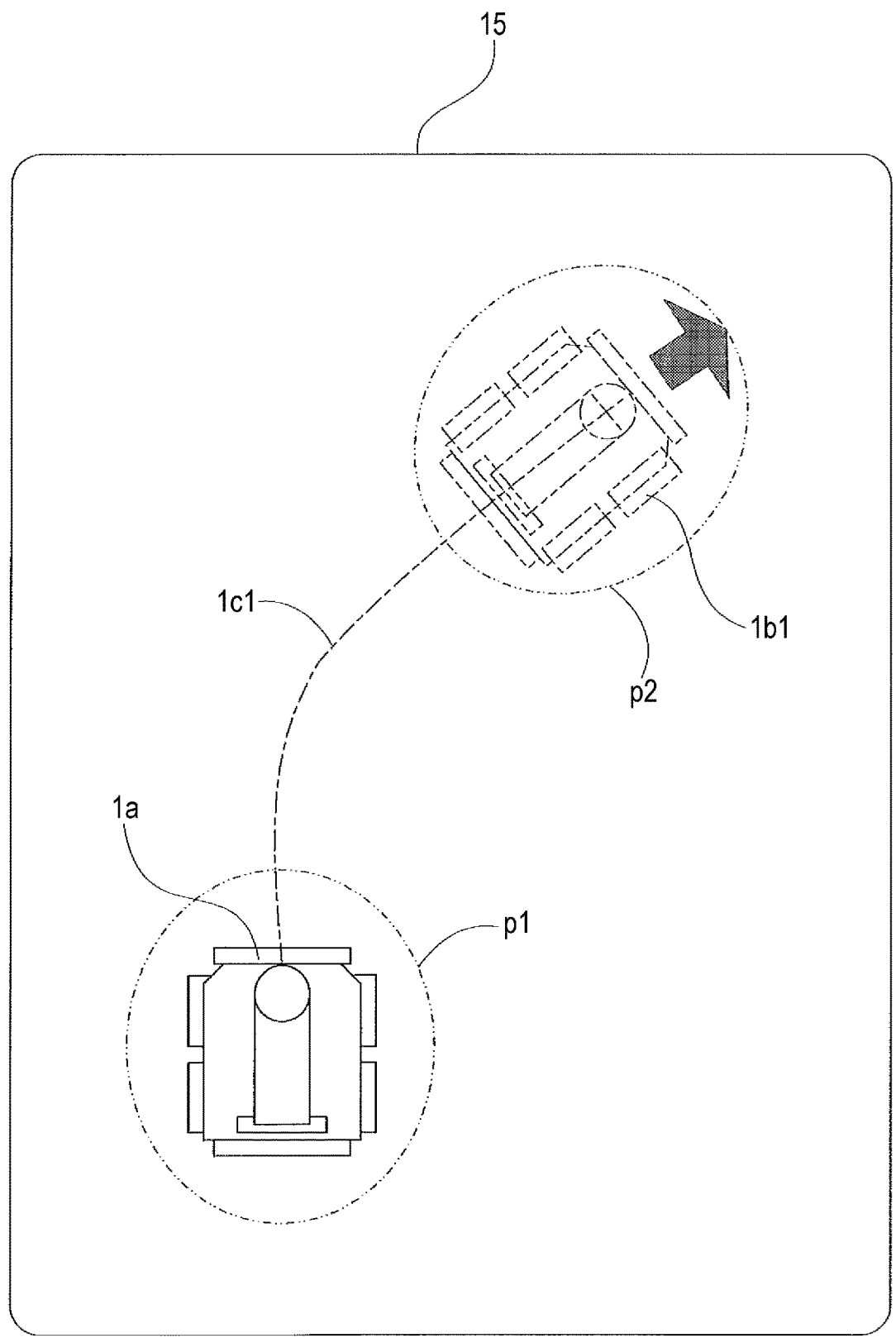
FIG. 4 is an explanatory diagram illustrating an example of a travel path as is set for the autonomous travel vehicle in a simulation on the display unit by the autonomous travel vehicle control device.
Figure 5:
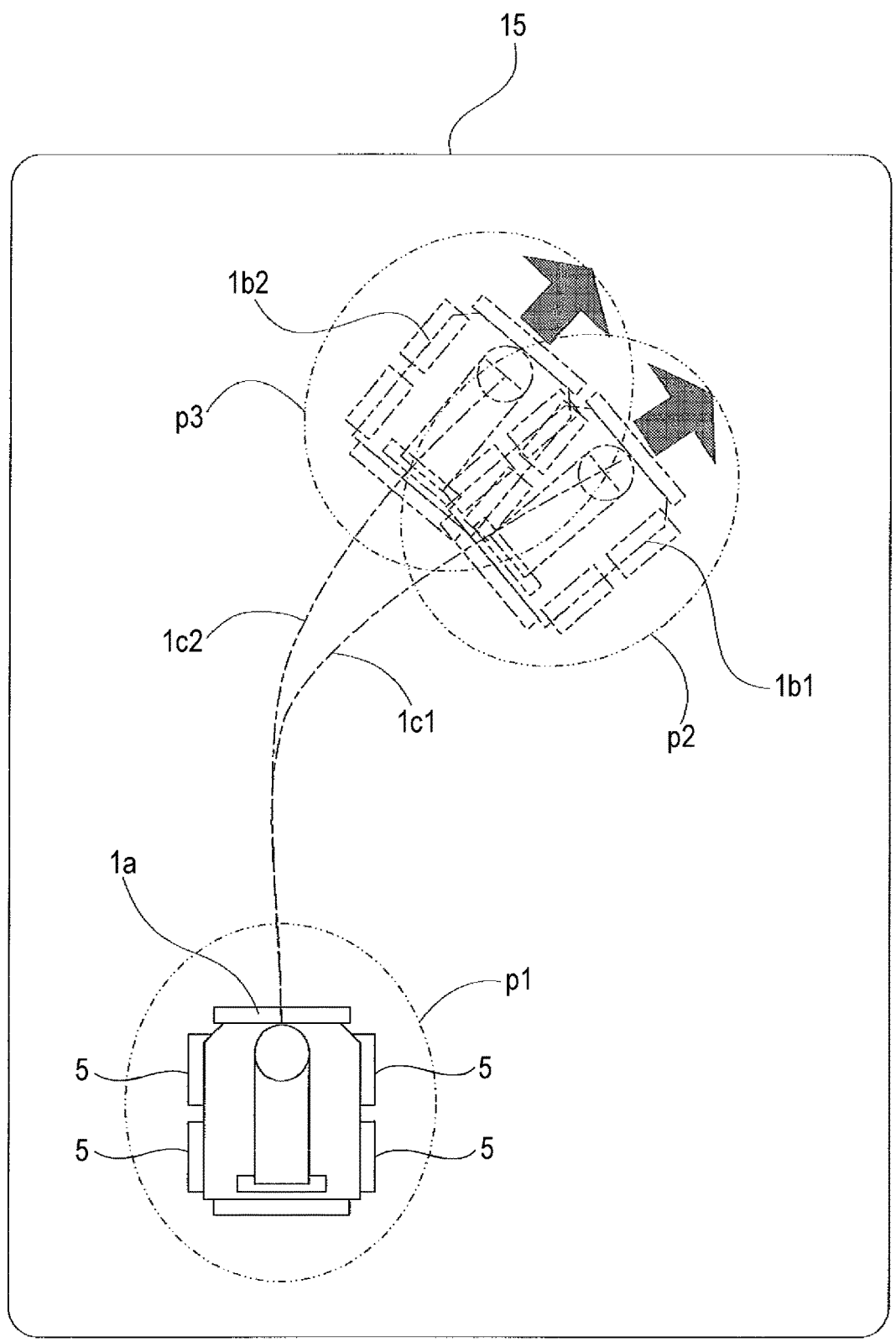
FIG. 5 is an explanatory diagram illustrating an example of a travel path in a case where the travel of the autonomous travel vehicle in the simulation on the display unit by the autonomous travel vehicle control device is influenced.

Hereinafter, embodiments for an autonomous travel vehicle control device in the present disclosure will be described with reference to the drawings. FIG. 1 is an explanatory diagram illustrating an overall configuration of an autonomous travel vehicle on which a travel control is performed by an autonomous travel vehicle control device in a first embodiment which is an example of embodiments of the of the present disclosure, FIG. 2 is a block diagram illustrating a configuration of the autonomous travel vehicle control device, FIG. 3 is a block diagram illustrating a configuration of an information processing unit that configures the autonomous travel vehicle control device, FIG. 4 is an explanatory diagram illustrating an example of a travel path as is set for the autonomous travel vehicle in a simulation on the display unit by the autonomous travel vehicle control device, and FIG. 5 is an explanatory diagram illustrating an example of a travel path in a case where the travel of the autonomous travel vehicle in the simulation on the display unit by the autonomous travel vehicle control device is influenced.

Figure 2:
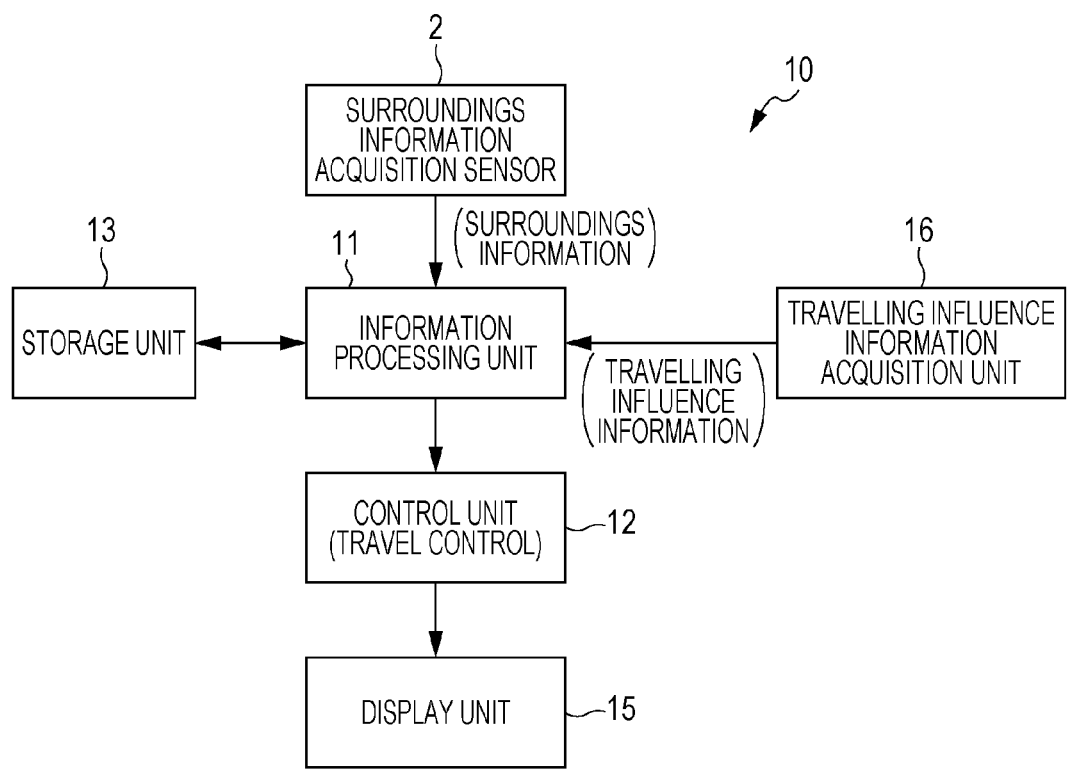
FIG. 2 is a block diagram illustrating a configuration of the autonomous travel vehicle control device.

As illustrated in FIG. 1 and FIG. 2, an autonomous travel vehicle control device 10 in the first embodiment includes a surroundings information acquisition sensor 2 as a detection unit that acquires surroundings information in the travelling direction, sets a travel path of an autonomous travel vehicle performing autonomous travel based on the surroundings information, and an autonomous travel vehicle control device including a specific configuration in the present disclosure is adopted therein.

Here, the autonomous travel vehicle is an apparatus that autonomously travels by a machine or a program without intervention of a human judgement, and for example, an autonomous industrial carrier vehicle that carries objects in a factory and an autonomous monitoring vehicle that monitors the inside of specified areas in the field, are known.

As illustrated in FIG. 1, an autonomous travel vehicle 1 in the first embodiment is configured to include a surroundings information acquisition sensor 2, a vehicle body (apparatus body) 3, tires 5 for travelling, and bumpers 7 functioning as a cushioning member.

As illustrated in FIG. 2, the autonomous travel vehicle control device 10 in the first embodiment includes an information processing unit 11 that processes the surroundings information acquired by the surroundings information acquisition sensor 2, a control unit 12 that controls the travelling of the autonomous travel vehicle 1 based on the surroundings information, a storage unit 13 that stores the surroundings information acquired by the surroundings information acquisition sensor 2, and a display unit 15.

The information processing unit 11, the control unit 12, the storage unit 13, and the display unit 15 configuring the autonomous travel vehicle control device 10 are provided in an external server (not illustrated) that controls the driving of the autonomous travel vehicle 1. The external server is connected to the autonomous travel vehicle 1 in a wirelessly communicable manner.

That is, an autonomous travel vehicle control system is configured to include the autonomous travel vehicle 1 that performs the autonomous travel and the external server.

A laser type sensor is used for the surroundings information acquisition sensor 2. The laser type sensor measures a distance to a target object based on a time from emission to reception of laser by emiting laser from an emission unit and detecting a reflection light reflected from a surface of the target object at a reception unit.

As illustrated in FIG. 1, the surroundings information acquisition sensor 2 is disposed at the front of the vehicle body 3 of the autonomous travel vehicle 1. That is, it is possible to acquire the surroundings information in the travelling direction of the autonomous travel vehicle 1 using the surroundings information acquisition sensor 2. A sign 2a indicates a detection area.

Furthermore, in the first embodiment, a travelling influence information acquisition unit 16 that acquires travelling influence information that influences the travel state of the autonomous travel vehicle 1 is included in the autonomous travel vehicle 1. The travelling influence information acquisition unit 16 may be a device that acquires image information using a CCD camera.

In the first embodiment, a state of the travelling road surface is acquired as image information (camera image) by the travelling influence information acquisition unit 16, color information of the travelling road surface is acquired from the acquired image information, and the state of the travelling road surface (whether a friction coefficient is large or small, whether or not the road surface is slippery, and whether or not the road surface is uneven and causes large vibrations) is determined using the color information. The color information of the travelling road surface may be displayed on the display unit.

In the state of the travelling road surface of the path once the vehicle has passed, if there is a road surface having a small friction coefficient and is slippery, or a road surface that causes large vibrations due to an uneven state as the travelling influence information, such positions may be displayed on a map displayed on the display unit so as to notify as a highly dangerous path.

The information items acquired by the surroundings information acquisition sensor 2 and the travelling influence information acquisition unit 16 are processed by the information processing unit 11.

As illustrated in FIG. 3, the information processing unit 11 includes a recognition processing unit 111, an obstacle determination unit 112, a moving path determination unit 113, a travel path prediction unit 115, and a travel path display unit 117.

The recognition processing unit 111 recognizes a position of the surroundings information. The obstacle determination unit 112 recognizes the surroundings information and determines whether or not an obstacle is present ahead of the autonomous travel vehicle 1. The moving path determination unit 113 determines a path of the autonomous travel vehicle 1 to move using the recognition of the surroundings information by the recognition processing unit 111 and the determination of the presence or absence of the obstacle by the obstacle determination unit 112.

The travel path prediction unit 115 predicts a deviation or the like of the travel path based on the travelling influence information. Here, the travel path prediction unit 115 acquires color information of the travelling road surface from the image information acquired as the travelling influence information, determines the state of the travelling road surface (whether the friction coefficient is large or small or whether or not the road surface is slippery) based on the color information, and then, predicts the travel path that changes depending on the state of the travelling road surface.

In the determination of the state of the travelling road surface, a prediction table or the like may be used, in which an amount of slip and an amount of deviation are set by preset friction coefficients corresponding to the color information.

The travel path display unit 117 instructs the display unit 15 to display the travel path predicted by the travel path prediction unit 115. In the first embodiment, the travel path (set travel path) set by the user's instruction is also displayed together.

Specifically, in the first embodiment, in a case where the autonomous travel vehicle 1 is travelling as set, as illustrated in FIG. 4, the travel path display unit 117 displays a reduced image 1a of the autonomous travel vehicle 1 at a travel start position p1 on the display screen of the display unit 15 and displays a reduced image 1b1 at a user movement instructed position p2, and displays a set travel path 1c1 from the travel start position p1 to the user movement instructed position p2.

In a case where the travel state of the autonomous travel vehicle 1 is influenced, as illustrated in FIG. 5, the reduced image 1a of the autonomous travel vehicle 1 is displayed at the travel start position p1 and the reduced image 1b1 is displayed at the user movement instructed position p2, a reduced image 1b2 is displayed at a predicted movement position p3 where the travel state is influenced, the set travel path 1c1 from the travel start position p1 to the user movement instructed position p2 and a prediction travel path 1c2 to the predicted movement position p3 are displayed.

In FIG. 5, because a road surface state of the travel path on which the autonomous travel vehicle 1 is travelling is determined to be easy to slip and an amount of movement of the right-turning motion in the drawing becomes small due to the slip of the tires 5, it is predicted that the path is shifted to the leftward of the set travel path, and thus, the travel path and the movement position are shifted to the left.

In FIG. 5, in order for the user to easily check the travel path, the road surface state may be displayed. For example, in a state in which the travelling road surface is dry or muddy, since the slippery states differ from each other according to the friction coefficient, the road surface state may be displayed while changing a color or changing a display pattern according to the road surface state.

Figure 6:
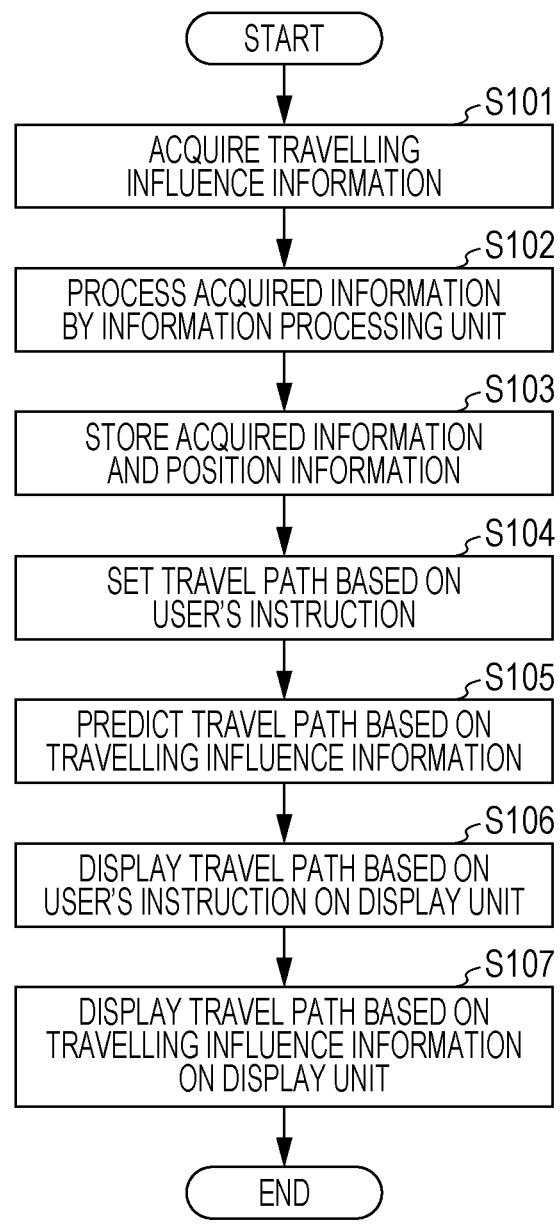
FIG. 6 is a flowchart illustrating a processing flow for performing the simulation of the travel of the autonomous travel vehicle.

Next, outline of a processing flow for the simulation of the travel of the autonomous travel vehicle 1 by the autonomous travel vehicle control device 10 will be described using a flowchart. FIG. 6 is a flowchart illustrating a processing flow for performing the simulation of the travel of the autonomous travel vehicle in the first embodiment.

As illustrated in FIG. 6, when the simulation of the travel of the autonomous travel vehicle 1 is started by the autonomous travel vehicle control device 10, first, the travelling influence information is acquired by the travelling influence information acquisition unit 16 (STEP S101).

The travelling influence information acquired by the travelling influence information acquisition unit 16 and position information of the autonomous travel vehicle 1 are sent to the information processing unit 11 and information processing for the autonomous travel is performed (STEP S102), and then, the result is stored in the storage unit 13 (STEP S103).

The travel path is set based on the user's instruction (STEP S104) and the travel path is predicted based on the travelling influence information, and then, the prediction travel path is set (STEP S105).

The set travel path set based on the user's instruction is displayed (STEP S106), and the prediction travel path predicted based on the travelling influence information is displayed on the display screen of the display unit 15 (STEP S107), and then, the simulation of the travel of the autonomous travel vehicle 1 ends.

In this way, the set travel path set based on the user's instruction and the prediction travel path predicted based on the travelling influence information are displayed on the display screen of the display unit 15 by the autonomous travel vehicle control device 10. Therefore, it is possible to check the travel path (travel state) before the autonomous travel vehicle 1 actually travels.

According to the first embodiment, with the above-described configuration, the autonomous travel vehicle control device 10 includes the moving path determination unit 113 that sets the travel path of the autonomous travel vehicle 1, the travelling influence information acquisition unit 16 that acquires the travelling influence information (for example, road surface state) influencing the travel state of the autonomous travel vehicle 1, the travel path prediction unit 115 that predicts the travel path based on the travelling influence information, and the travel path display unit 117 that displays the travel path predicted by the travel path prediction unit 115. Therefore, by displaying the prediction travel path predicted based on the travelling influence information on the display screen of the display unit 15, the travel path of the autonomous travel vehicle 1 can be predicted based on the travelling influence information using the simulation of the travel without causing the autonomous travel vehicle 1 to actually travel, and thus, it is possible to set a safe and accurate travel path.

In the first embodiment, the travelling influence information acquisition unit 16 acquires the state of the travelling road surface as the image information, acquires the color information of the travelling road surface from the acquired image information, and discriminates the slope of the color or gradation of the pixels based on the color information, and thus, it is possible to determined the state (whether the friction coefficient is large or small, whether or not the road surface is slippery, and whether or not the road surface is uneven and causes large vibrations) of the travelling road surface which is difficult for the user to determine, and thus, the travel path can be predicted.

For example, as to asphalt road surfaces that look the same, if it is a coarse road surface where there are holes that easily permeate rainwater or the like, it is hard to slip, but on a road surface without holes where rainwater or the like is hard to penetrate, it becomes easy to slip. As described above, even when it is difficult for the user (supervisor) to determine at first glance, it is possible to predict the travel path based on the travelling influence information and to display the travel path in the map on the display unit.

In the first embodiment, since the set travel path 1c1 set based on the user's instruction and the prediction travel path 1c2 predicted based on the travelling influence information are displayed on the display screen of the display unit 15, the user can compare the set travel path 1c1 and the prediction travel path 1c2, and can set the safe and accurate travel path.

In the first embodiment, the road surface state (dry road, a muddy road or the like) is used as the travelling influence information, but for example, the travel path may be predicted using the weather information (wind and rain, sunny weather, or wind direction).

Second Embodiment

Figure 7:
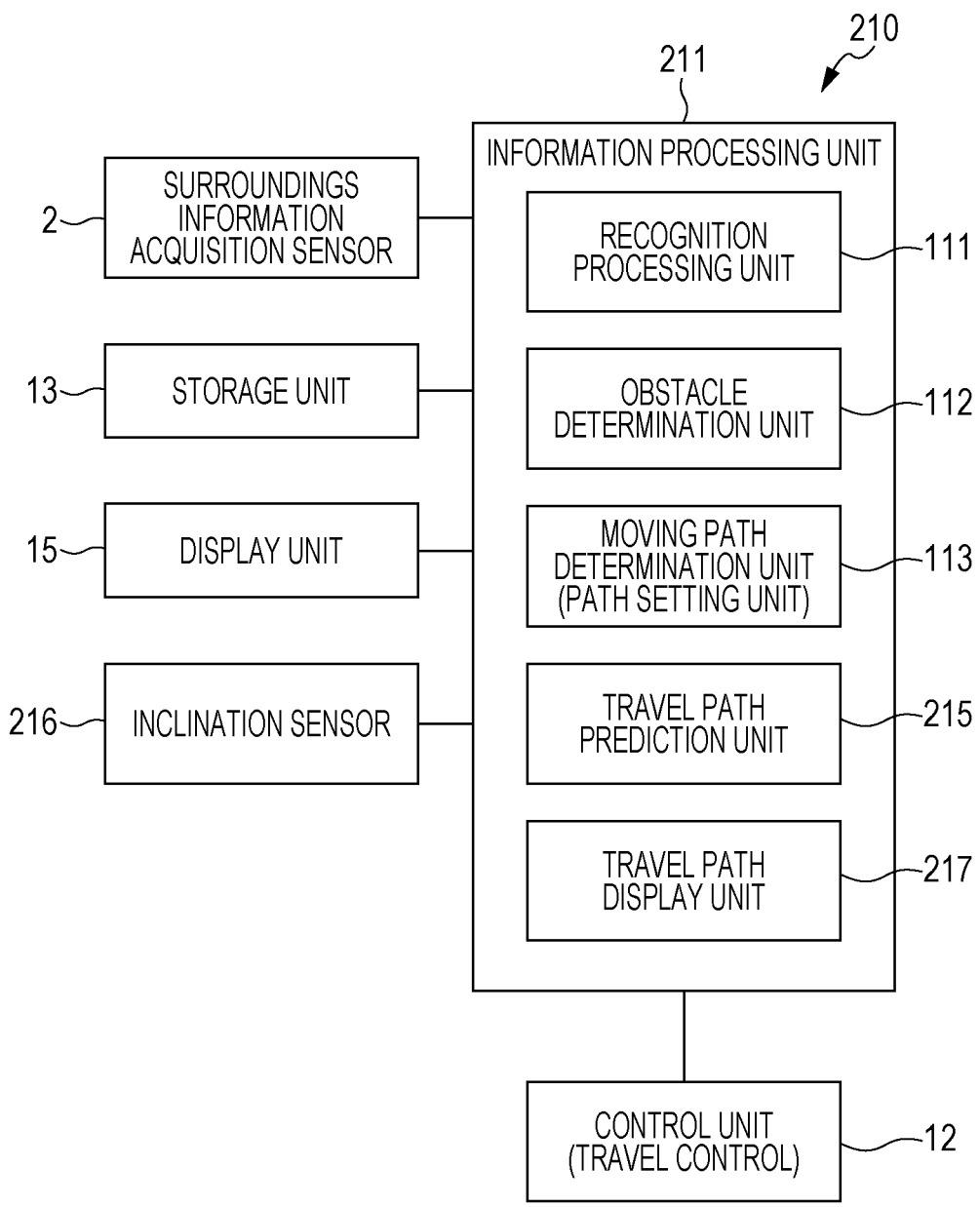
FIG. 7 is a block diagram illustrating a configuration of an information processing unit configuring an autonomous travel vehicle control device in a second embodiment in the present disclosure.
Figure 8:
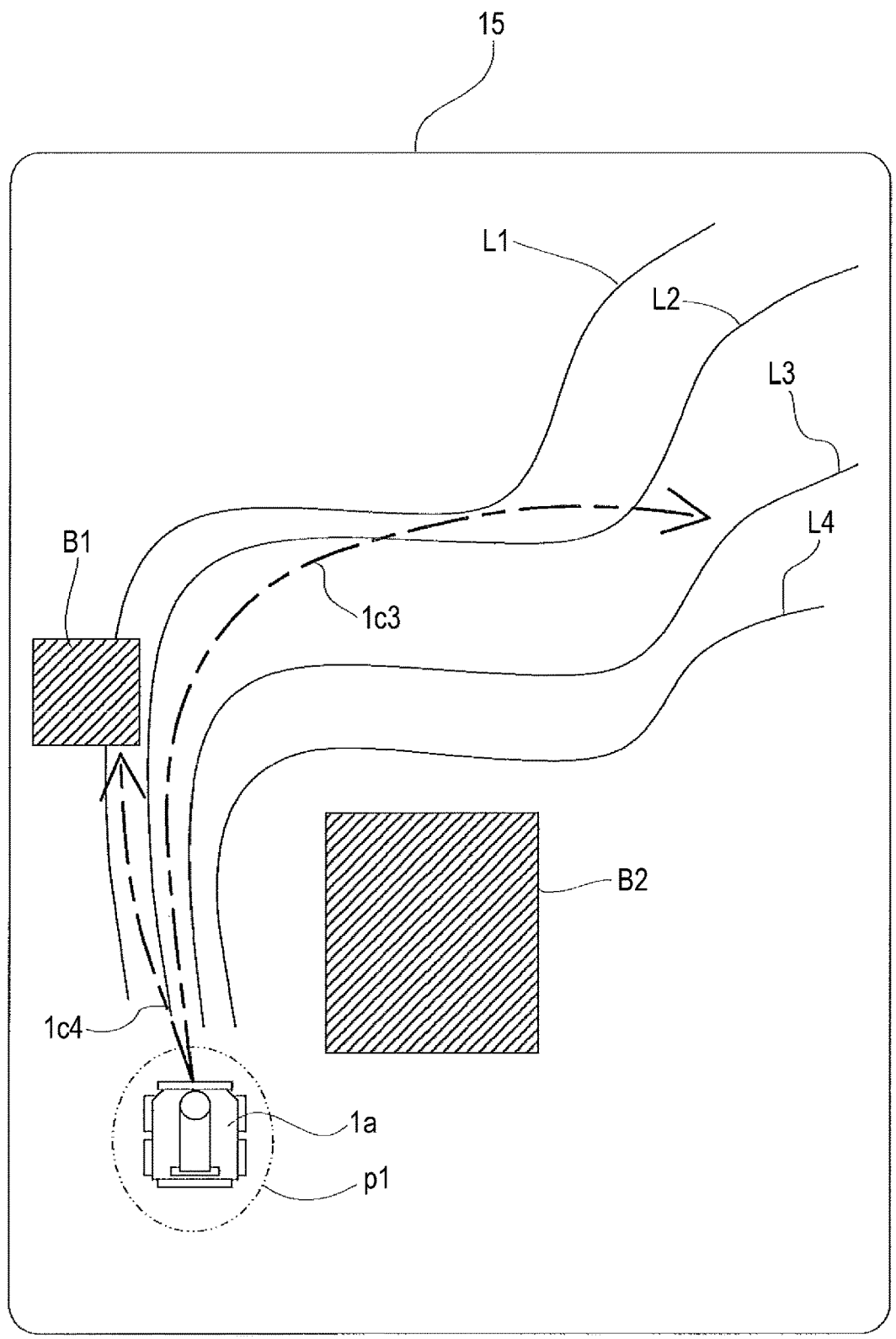
FIG. 8 is an explanatory diagram illustrating an example of a travel path of the autonomous travel vehicle in a state in which a travelling road surface is inclined in the simulation displayed on the display unit by the autonomous travel vehicle control device.

Next, a second embodiment in the present disclosure will be described with reference to the drawings. FIG. 7 is a block diagram illustrating a configuration of an information processing unit configuring an autonomous travel vehicle control device in the second embodiment in the present disclosure, and FIG. 8 is an explanatory diagram illustrating an example of a travel path of the autonomous travel vehicle in a state in which a travelling road surface is inclined in the simulation on the display unit by the autonomous travel vehicle control device.

In the autonomous travel vehicle control device in the second embodiment, the same reference signs will be given to the configuration elements same with or similar to those in the autonomous travel vehicle control device in the first embodiment, and the descriptions thereof will be omitted.

As illustrated in FIG. 7, the autonomous travel vehicle control device 210 in the second embodiment includes an information processing unit 211, the control unit 12, the storage unit 13, and the display unit 15, and includes an inclination sensor 216 that detects a posture of the autonomous travel vehicle 1 instead of the travelling influence information acquisition unit 16 in the first embodiment.

Similarly to the first embodiment, the information processing unit 211 configuring the autonomous travel vehicle control device 210, the control unit 12, the storage unit 13, and the display unit 15 are provided in an external server (not illustrated) that controls the travelling of the autonomous travel vehicle 1.

The inclination sensor 216 is mounted on the vehicle body 3 and detects a state of the posture of the autonomous travel vehicle 1, for example, inclination information such as upward, downward, inclined to the right, inclined to the left, or the like. Since a change of the travel posture of the autonomous travel vehicle 1 influences the travel, the inclination information is acquired by the inclination sensor 216 as the travelling influence information.

The information processing unit 211 includes a recognition processing unit 111, an obstacle determination unit 112, a moving path determination unit 113, a travel path prediction unit 215, and a travel path display unit 217.

In the second embodiment, in a case where there is an inclined surface on the road surface on which the autonomous travel vehicle 1 travels, since the travel state is changed according to the inclination state on the travelling road surface, an inclination angle of the travelling road surface detected in advance by the inclination sensor 216 is used as travelling influence information.

In the second embodiment, the travel path prediction unit 215 determines the state of the travelling road surface based on the inclination information (inclination angle) acquired by the inclination sensor 216 as the travelling influence information, and then, predicts a travel path that changes according to the state of the travelling road surface.

The state of the travelling road surface may be determined using a prediction table or the like in which an amount of slip and an amount of shift are set according to the inclination angle of the autonomous travel vehicle 1 set in advance. In addition, the amount of slip or the amount of shift may be set while considering the friction coefficient of the road surface in addition to the inclination angle.

In the second embodiment, as illustrated in FIG. 8, a map screen including contour lines L1, L2, L3, and L4 indicating a landshape and obstacles B1 and B2 is displayed on the display unit 15. When intervals of the contour lines L1, L2, L3, and L4 are narrow, the inclination angle of the road surface is sharp, and when the intervals are wide, the inclination angle of the road surface is loose.

In the second embodiment, as illustrated in FIG. 8, the travel path display unit 217 displays a reduced image 1a of the autonomous travel vehicle 1 at the travel start position on the map screen of the display unit 15 and displays the set travel path 1c3 set by the user from the travel start position p1, and displays a prediction travel path 1c4 in which the travel state is supposed to be influenced by the inclined surface. Here, since the obstacle B1 is present on the prediction travel path 1c4, the prediction travel path 1c4 becomes a path up to the position of the obstacle B1.

Figure 9:
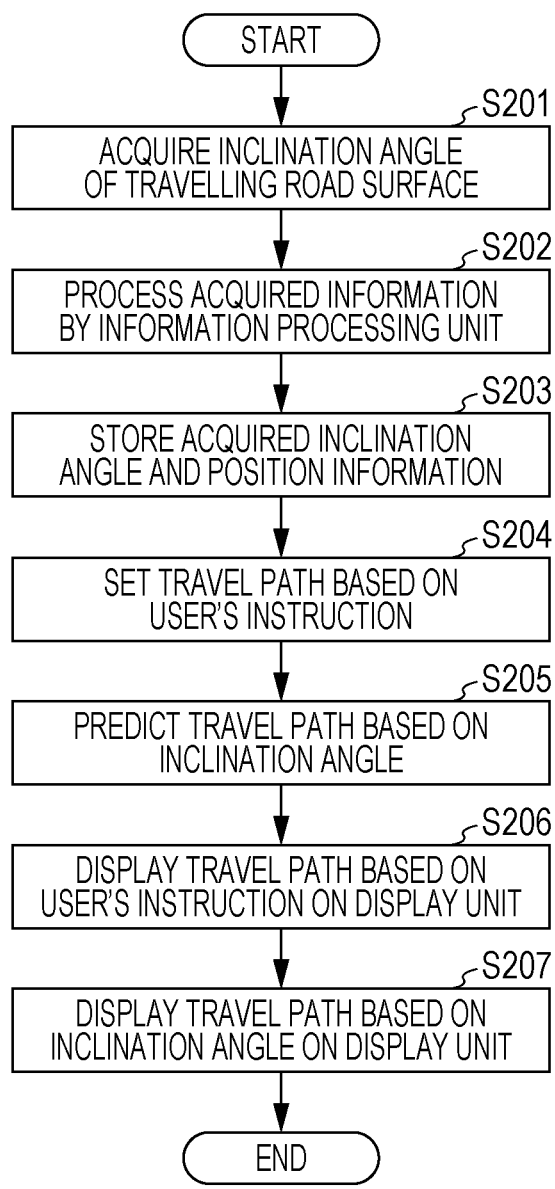
FIG. 9 is a flowchart illustrating a processing flow for performing the simulation of the travel of the autonomous travel vehicle.

Next, outline of the processing flow for performing the simulation of the travel of the autonomous travel vehicle 1 by the autonomous travel vehicle control device 210 in the second embodiment will be described using a flowchart. FIG. 9 is a flowchart illustrating a processing flow for performing the simulation of the travel of the autonomous travel vehicle in the second embodiment.

As illustrated in FIG. 9, when the simulation of the travel of the autonomous travel vehicle 1 is started by the autonomous travel vehicle control device 210, first, the inclination angle of the travelling road surface detected by the inclination sensor 216 in advance is acquired (STEP S201).

The information on the inclination angle detected by the inclination sensor 216 in advance and the position information of the autonomous travel vehicle 1 are sent to the information processing unit 211 and necessary information processing for the autonomous travel is performed (STEP S202), and then, the result is stored in the storage unit 13 (STEP S203).

The travel path is set based on the user's instruction (STEP S204) and the travel path is predicted based on the inclination angle of the travelling road surface, and then, the prediction travel path is set (STEP S205).

The set travel path 1c3 set based on the user's instruction is displayed on the display screen of the display unit 15 (STEP S206), and the prediction travel path 1c4 predicted based on the inclination angle is displayed (STEP S207), and then, the simulation of the travel of the autonomous travel vehicle 1 ends.

In this way, the set travel path 1c3 set based on the user's instruction and the prediction travel path 1c4 predicted based on the inclination angle of the travelling road surface are displayed on the map screen of the display unit 15 by the autonomous travel vehicle control device 210. Therefore, it is possible to confirm the travel path (travel state) before the autonomous travel vehicle 1 actually travels.

According to the second embodiment, with the above-described configuration, the travel path of the autonomous travel vehicle 1 is predicted according to the inclination angle of the travelling road surface, and the prediction travel path 1c4 displayed on the map screen can be checked, and thus, it is possible to set a safe and accurate travel path.

In the second embodiment, the set travel path 1c3 set based on the user's instruction and the prediction travel path 1c4 predicted based on the inclination angle are displayed on the map screen of the display unit 15. Therefore, the user can compare the set travel path 1c3 and the prediction travel path 1c4, and can set a safe and accurate travel path.

In the second embodiment, the travel path is predicted based on the inclination angle detected in advance by the inclination sensor 216. However, the travel path may be predicted based on an inclination angle calculated according to intervals of contour lines on the map screen.

Third Embodiment

Figure 10:
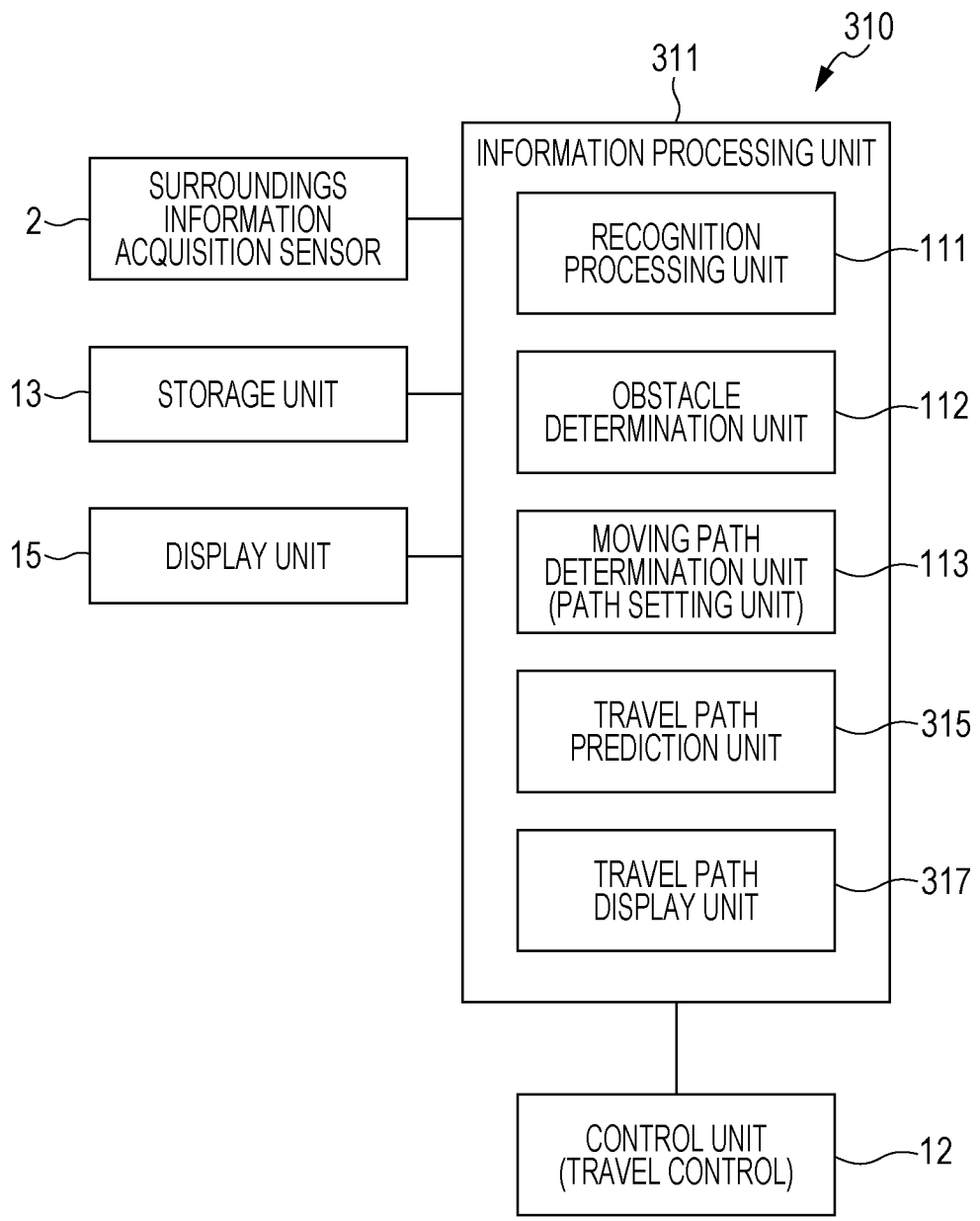
FIG. 10 is a block diagram illustrating a configuration of an information processing unit configuring an autonomous travel vehicle control device in a third embodiment in the present disclosure.
Figure 11:
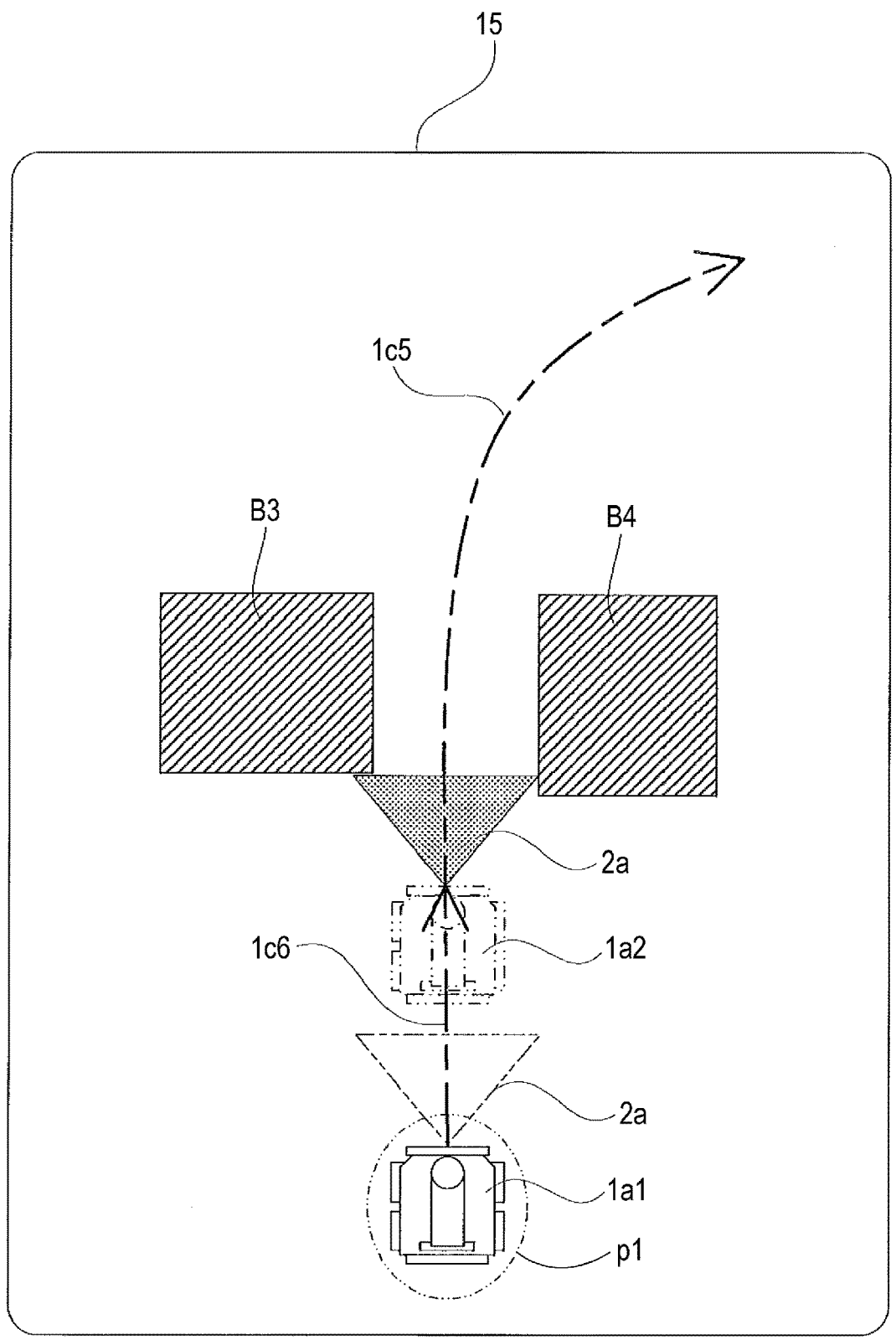
FIG. 11 is an explanatory diagram illustrating an example of a travel path of the autonomous travel vehicle when an obstacle on the travelling road surface is detected in the simulation on the display unit by the autonomous travel vehicle control device.

Next, a third embodiment in the present disclosure will be described with reference to the drawings. FIG. 10 is a block diagram illustrating a configuration of an information processing unit configuring an autonomous travel vehicle control device in the third embodiment in the present disclosure, and FIG. 11 is an explanatory diagram illustrating an example of a travel path of the autonomous travel vehicle when an obstacle on the travelling road surface is detected in the simulation on the display unit by the autonomous travel vehicle control device.

In the autonomous travel vehicle control device in the third embodiment, the same reference signs will be given to the configuration elements same with or similar to those in the autonomous travel vehicle control device in the first embodiment, and the descriptions thereof will be omitted.

As illustrated in FIG. 10, an autonomous travel vehicle control device 310 in the third embodiment is configured to include an information processing unit 311, the control unit 12, the storage unit 13, and the display unit 15. The surroundings information acquisition sensor 2 of the autonomous travel vehicle 1 is configured to function as a travelling influence information acquisition unit.

Similarly to the first embodiment, the information processing unit 311, control unit 12, storage unit 13, display unit 15 configuring the autonomous travel vehicle control device 310 are provided in an external server (not illustrated) that controls the travelling of the autonomous travel vehicle 1.

The information processing unit 311 includes the recognition processing unit 111, the obstacle determination unit 112, the moving path determination unit 113, a travel path prediction unit 315, and a travel path display unit 317.

In the third embodiment, in a case where an obstacle is present on the road surface on which the autonomous travel vehicle 1 travels, the travel path prediction unit 315 determines that the travelling is influenced by the obstacle and sets the travel path up to the obstacle.

In the third embodiment, as illustrated in FIG. 11, the travel path display unit 317 displays a detection area 2a of the surroundings information acquisition sensor 2 on the display screen of the display unit 15 in addition to the reduced image 1a1 of the autonomous travel vehicle 1 at the travel start position, and displays a set travel path 1c5 set by the user from the travel start position p1. In a case where obstacles B3 and B4 are present in the vicinity of the set travel path 1c5 and in a case where it is determined that the travelling of the autonomous travel vehicle 1 is not possible, the autonomous travel vehicle 1 stops at a position in front of the obstacles B3 and B4, and the prediction travel path 1c6 becomes a path up to the position in front of the obstacles B3 and B4. In the drawing, the reduced image 1a2 indicates a state in which the vehicle stops at the position in front of the obstacles B3 and B4.

The detection area 2a of the surroundings information acquisition sensor 2 displayed on the display unit 15 may be displayed in a color different from that of another area, or the detection area 2a may be displayed so as to blink.

As an example of displaying the detection area 2a, the detection area 2a may be displayed by changing a color depending on a type of the surroundings information acquisition sensor 2 used. For example, the detection areas of four directions detected by four side cameras mounted on four directions of the vehicle body as the travelling influence information acquisition unit, may be displayed by changing the colors.

As an example of displaying the detection area 2a, in a case where the surroundings information acquisition sensor 2 detects an obstacle, the detection area may be displayed by changing from the color of the detection area 2a in the normal time to another color.

Furthermore, in a case where the surroundings information acquisition sensor 2 detects an obstacle, a warning may be displayed on the display unit 15.

Figure 12:
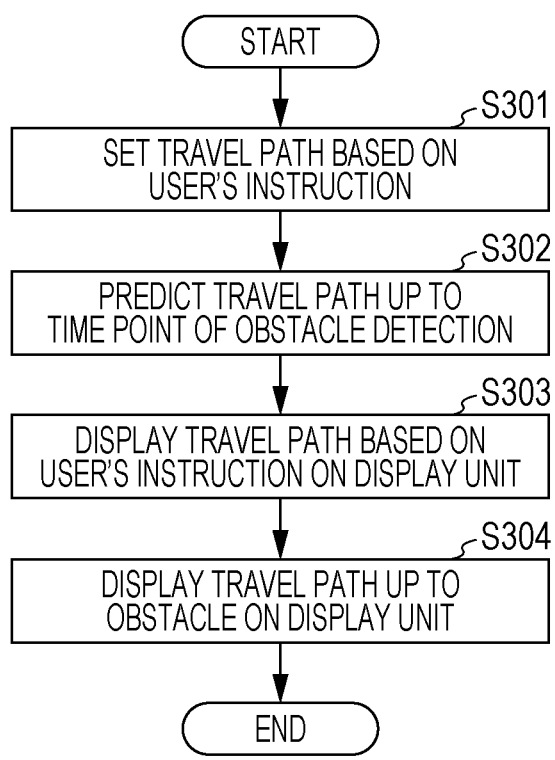
FIG. 12 is a flowchart illustrating a processing flow for performing the simulation of the travel of the autonomous travel vehicle.

Next, outline of the processing flow for performing the simulation of the travel of the autonomous travel vehicle 1 by the autonomous travel vehicle control device 310 in the third embodiment will be described using a flowchart. FIG. 12 is a flowchart illustrating a processing flow for performing the simulation of the travel of the autonomous travel vehicle in the third embodiment.

As illustrated in FIG. 12, when the simulation of the travel of the autonomous travel vehicle 1 is started by the autonomous travel vehicle control device 310, first, the travel path is set based on the user's instruction (STEP S301). In a case where a thing detected by the surroundings information acquisition sensor 2 is determined to be an obstacle by the obstacle determination unit 112, the travel path up to the time point of obstacle detection is predicted and set (STEP S302).

The set travel path 1c5 set based on the user's instruction is displayed on the map screen of the display unit 15 (STEP S303), and the prediction travel path 1c6 up to the front of the obstacle is displayed (STEP S304), and then, the simulation of the travel of the autonomous travel vehicle 1 ends.

In this way, the set travel path 1c5 set based on the user's instruction and the prediction travel path 1c6 up to the point of the obstacle detection are displayed on the map screen of the display unit 15 by the autonomous travel vehicle control device 310. Therefore, it is possible to confirm that, in a case where the obstacle is detected, the autonomous travel vehicle 1 stops in front of the obstacle before the autonomous travel vehicle 1 actually travels.

According to the third embodiment, with the above-described configuration, in a case where an obstacle is detected by the surroundings information acquisition sensor 2 and it is determined that the travelling of the autonomous travel vehicle 1 is impossible, it is possible to check on the display screen that the travelling of the autonomous travel vehicle 1 can be stopped and the prediction travel path 1$c$6 can be set up to the front of the obstacle, and thus, the user can set a safe and accurate travel path.

In the embodiments described above, a laser sensor that acquires the position information and a CCD sensor that acquires the image information are adopted as the detection units that detect the surroundings information of the autonomous travel vehicle. However, the present disclosure is not limited to those detection units, and an ultrasonic sensor and the like may be used as another example, which emits an ultrasonic wave and measures a distance to the target object by detecting a sonic wave reflected on a surface of the target object by a reception unit.

In the embodiments described above, the information processing unit, the control unit, the storage unit, and the display unit configuring the autonomous travel vehicle control device are provided in the external server that controls the driving of the autonomous travel vehicle 1, and the surroundings information acquisition sensor 2 is provided in the autonomous travel vehicle 1. However, the present disclosure is not limited thereto.

For example, as a configuration of the autonomous travel vehicle control device, a part (information processing unit, display unit, and so on) of the device may be provided in the external server and a unit (the control unit that controls the travel) relating to the travel control of the autonomous travel vehicle 1 may be mounted on the autonomous travel vehicle 1. The sensors may be provided in the autonomous travel vehicle 1 and units relating to the control other than the sensors may be provided in the external server that controls the driving of the autonomous travel vehicle 1. In addition, entire of the units configuring the autonomous travel vehicle control device may be mounted on the autonomous travel vehicle 1 and the travel control of the autonomous travel vehicle 1 may be performed by the autonomous travel vehicle 1 alone.

In the embodiments described above, an example of a case is described, where an autonomous travel device is applied to an autonomous travel vehicle that functions as a security patrol robot. However, it is needless to say that the device can be applied to another autonomous travel device. For example, the device may be applied to devices such as automatic carrier devices, unmanned patrol vehicles, unmanned home delivery robots, and unmanned operation agricultural machines.

As described above, the present disclosure is not limited to the embodiments described above, and various modifications can be made within the scope indicated in the claims. That is, embodiments obtained by combining technical means appropriately modified within the range indicated in the claims are also included in the technical scope of the present disclosure.

The present disclosure is not limited to the embodiments described above and various modifications can be made within the scope indicated in the claims. That is, embodiments obtained by combining technical means appropriately modified within the range of not departing from the gist of the invention are also included in the technical scope of the present disclosure.

The present disclosure contains subject matter related to that disclosed in Japanese Priority Patent Application JP 2016-165283 filed in the Japan Patent Office on Aug. 26, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An autonomous travel vehicle control device that sets a travel path of an autonomous travel vehicle performing autonomous travel based on surroundings information, comprising:
   a display unit that displays a travel path of the autonomous travel vehicle;
   a path setting unit that sets a first travel path according to an instruction of a user;
   a travelling influence information acquisition unit that acquires travelling influence information influencing a travel state of the autonomous travel vehicle;
   a travel path prediction unit that predicts a second travel path based on the travelling influence information by comparing the first travel path set by the path setting unit to the second travel path on which the autonomous travel vehicle actually travels; and
   a travel path display unit that displays the second travel path predicted by the travel path prediction unit on the display unit.

2. The autonomous travel vehicle control device according to claim 1,
   wherein the travel path display unit displays the first travel path set by the path setting unit based on surroundings information which does not include the travelling influence information.

3. The autonomous travel vehicle control device according to claim 2,
   wherein the travel path prediction unit predicts the second travel path based on travel information on a previously travelled path.

4. The autonomous travel vehicle control device according to claim 1,
   wherein the travel path prediction unit predicts the second travel path based on travel information on a previously travelled path.

5. The autonomous travel vehicle control device according to claim 1,
   wherein the travelling influence information includes a road surface state.

6. The autonomous travel vehicle control device according to claim 5, further comprising:
   a road surface state display unit that displays the road surface state on the display unit based on the travelling influence information.

7. The autonomous travel vehicle control device according to claim 6,
   wherein the road surface state display unit sets a color of the road surface displayed on the display unit according to a friction coefficient of the road surface, and displays the road surface state on the display unit based on information on the set color.

8. The autonomous travel vehicle control device according to claim 1,
   wherein the travelling influence information includes position information of an obstacle.

9. The autonomous travel vehicle control device according to claim 1, wherein the travelling influence information includes an inclination state of a road surface.

10. The autonomous travel vehicle control device according to claim 8,
wherein, in a case where an obstacle is present on the second travel path, the travel path prediction unit makes the predicted second travel path be up to a front of the obstacle.

11. The autonomous travel vehicle control device according to claim 1,
wherein the travelling influence information includes weather information.

12. The autonomous travel vehicle control device according to claim 6,
wherein the road surface state display unit sets a pattern of the road surface displayed on the display unit according to a friction coefficient of the road surface, and displays the road surface state on the display unit based on information on the set pattern.

13. The autonomous travel vehicle control device according to claim 1,
wherein the travelling influence information acquisition unit is a detection unit that detects an area ahead of the autonomous travel vehicle, and
wherein the travel path display unit has a function of displaying a detection area of the travelling influence information acquisition unit on the display unit.

14. The autonomous travel vehicle control device according to claim 13,
wherein the detection area is displayed in a color which is different from that of another area displayed on the display unit.

15. The autonomous travel vehicle control device according to claim 13,
wherein the detection area is displayed in a manner of blinking.

16. The autonomous travel vehicle control device according to claim 13,
wherein the detection area is displayed by changing a color depending on a type of the detection unit used as the travelling influence information acquisition unit.

17. The autonomous travel vehicle control device according to claim 13,
wherein, in a case where the travelling influence information acquisition unit detects an obstacle, the detection area is displayed by changing from a color of the detection area in a normal time to a different color.

18. An autonomous travel vehicle control system that sets a travel path of an autonomous travel vehicle, comprising:
an autonomous travel vehicle that performs autonomous travel based on surroundings information; and
an external server that is capable of wirelessly communicating with the autonomous travel vehicle,
wherein the autonomous travel vehicle includes;
a control unit that controls the travelling of the autonomous travel vehicle, and
a travelling influence information acquisition unit that acquires travelling influence information influencing a travel state of the autonomous travel vehicle,
wherein the external server includes;
a display unit that displays a travel path of the autonomous travel vehicle,
a path setting unit that sets a first travel path according to an instruction of a user,
a travel path prediction unit that predicts a second travel path based on the travelling influence information acquired by the travelling influence information acquisition unit by comparing the first travel path set by the path setting unit to the second travel path on which the autonomous travel vehicle actually travels, and
a travel path display unit that displays the second travel path predicted by the travel path prediction unit on the display unit.

19. An autonomous travel vehicle control method for setting a travel path of an autonomous travel vehicle performing autonomous travel based on surroundings information, comprising:
displaying the travel path of the autonomous travel vehicle;
setting a first travel path according to an instruction of a user;
acquiring travelling influence information influencing a travel state of the autonomous travel vehicle;
predicting a second travel path based on the travelling influence information by comparing the first travel path set by the path setting unit to the second travel path on which the autonomous travel vehicle actually travels; and
displaying the second travel path predicted by the travel path prediction unit on the display unit.

20. A non-transitory recording medium in which a program for executing the autonomous travel vehicle control method according to claim 19 is recorded.

* * * * *